March 12, 1968  H. F. SMITH  3,372,541
GAS TURBINE ENGINE COMBUSTION CHAMBER
Filed June 9, 1966  2 Sheets-Sheet 1

Inventor
Herbert Frank Smith
By
Cushman, Darby & Cushman
Attorneys

March 12, 1968  H. F. SMITH  3,372,541
GAS TURBINE ENGINE COMBUSTION CHAMBER
Filed June 9, 1966  2 Sheets-Sheet 2

Inventor
Herbert Frank Smith
By
Cushman, Darby & Cushman
Attorneys

United States Patent Office 3,372,541
Patented Mar. 12, 1968

3,372,541
GAS TURBINE ENGINE COMBUSTION CHAMBER
Herbert Frank Smith, Derby, England, assignor to Rolls-Royce Limited, Derby, England, a British company
Filed June 9, 1966, Ser. No. 556,420
Claims priority, application Great Britain, June 21, 1965, 26,207/65
12 Claims. (Cl. 60—39.65)

ABSTRACT OF THE DISCLOSURE

A gas turbine engine has an annular combustion chamber and flame tube which is disposed outwardly of the compressor outlet and turbine inlet, the combustion chamber being inclined in a downstream direction so that it is disposed radially outwardly of the turbine. Part of the air leaving the compressor is directed into the combustion chamber, while the remainder, constituting dilution air, passes directly across the radially inner part of the combustion chamber without substantial change of flow.

Figure 1:
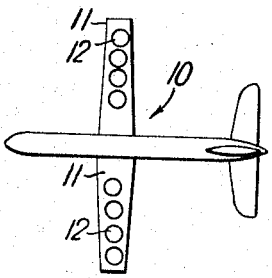

This invention concerns a combustion chamber for a gas turbine engine.

The combustion chamber of the present invention may, for example, be employed in a vertical lift gas turbine engine of an aircraft, i.e., an engine arranged to produce vertical lift forces independently of the lift forces generated aerodynamically by forward flight of the aircraft.

Vertical lift engines are often designed to be put in aircraft wings with the longitudinal axes of the engines vertically arranged. The axial length of the engines must therefore be such that they will fit into the depth of the wing and an object of the present invention is to provide a combustion chamber which, when used in a vertical lift engine, will permit reduction in the axial length thereof.

According to the present invention, there is provided a combustion chamber for a gas turbine engine comprising a casing structure having an inlet portion which is adapted to communicate substantially directly with and receive air from a compressor of the engine, and an outlet portion which is adapted to communicate substantially directly with and supply combustion gases to a turbine of the engine, both the said inlet and outlet portions being disposed at an inner portion only of the engine, at least one flame tube which is mounted within the casing structure and spaced therefrom, at least substantially the whole of the or each flame tube being disposed radially outwardly of the said inlet portion, and the upstream end of the inlet portion being disposed forwardly of any portion of the or each flame tube, means for supplying fuel to the or each flame tube, means for directing a portion only of the air passing through the inlet portion into a radially outer part of the or each flame tube where combustion takes place and means for passing substantially all the remaining portion of said air through a radially inner part of the or each flame tube to said outlet portion without substantially changing the direction of flow of said remaining portion.

Preferably, at least a substantial part of the or each flame tube is disposed rearwardly of the downstream end of the outlet portion.

The combustion chamber may be an annular combustion chamber having a single annular flame tube.

The combustion chamber may be provided with an annular combustion air duct which is adapted to supply the annular flame tube with combustion air which has passed through said inlet portion, the said annular combustion air duct extending along at least one side of the said annular flame tube.

Thus, the said one side may be the radially outer side of the annular flame tube. There may, moreover, be an annular cooling air duct which extends along the radially inner side of the annular flame tube.

The inlet portion preferably comprises guide means for directing inlet air into said combustion air duct.

There may, for example, be an annular dilution air duct for the flow therethrough of air which is used to dilute the products of combustion, said guide means directing part of the inlet air into the combustion air duct and part of the inlet air into the dilution air duct.

A plurality of angularly spaced apart hollow members may be mounted in the casing structure, each hollow member having apertures in said wall through which dilution air from the dilution air duct may pass into the interior of the hollow member, and each hollow member having an inlet portion which is arranged to receive the said products of combustion and an outlet portion which communicates with the outlet portion of the casing structure.

The invention also comprises a gas turbine engine provided in flow series with an axial flow compressor, a combustion chamber as set forth above, and an axial flow turbine the flame tube or tubes of the said combustion chamber being disposed radially outwardly of and being radially aligned with the axial flow turbine.

The engine may, for example, be a by-pass engine, e.g., an engine whose by-pass ratio is at least 1.5:1, the said casing structure forming a wall of the by-pass duct of the engine.

Preferably, the or each flame tube of the said combustion chamber is offset obliquely with respect to the longitudinal axis of the engine.

The engine may, if desired, be a vertical lift engine having a thrust to weight ratio of at least 8:1 and preferably of at least 12:1.

Additionally, the invention comprises an aircraft in which there is mounted at least one such vertical lift engine, the or each said vertical lift engine being mounted vertically with respect to the normal horizontal flight attitude of the aircraft.

Figure 2:
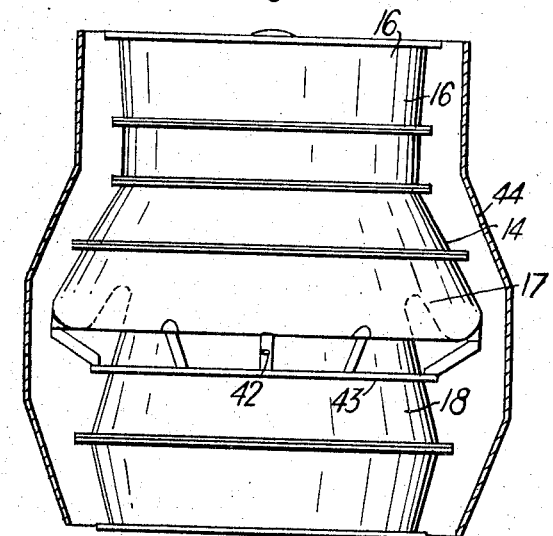
Figure 4:
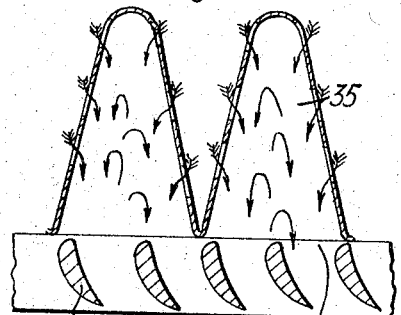
Figure 3:
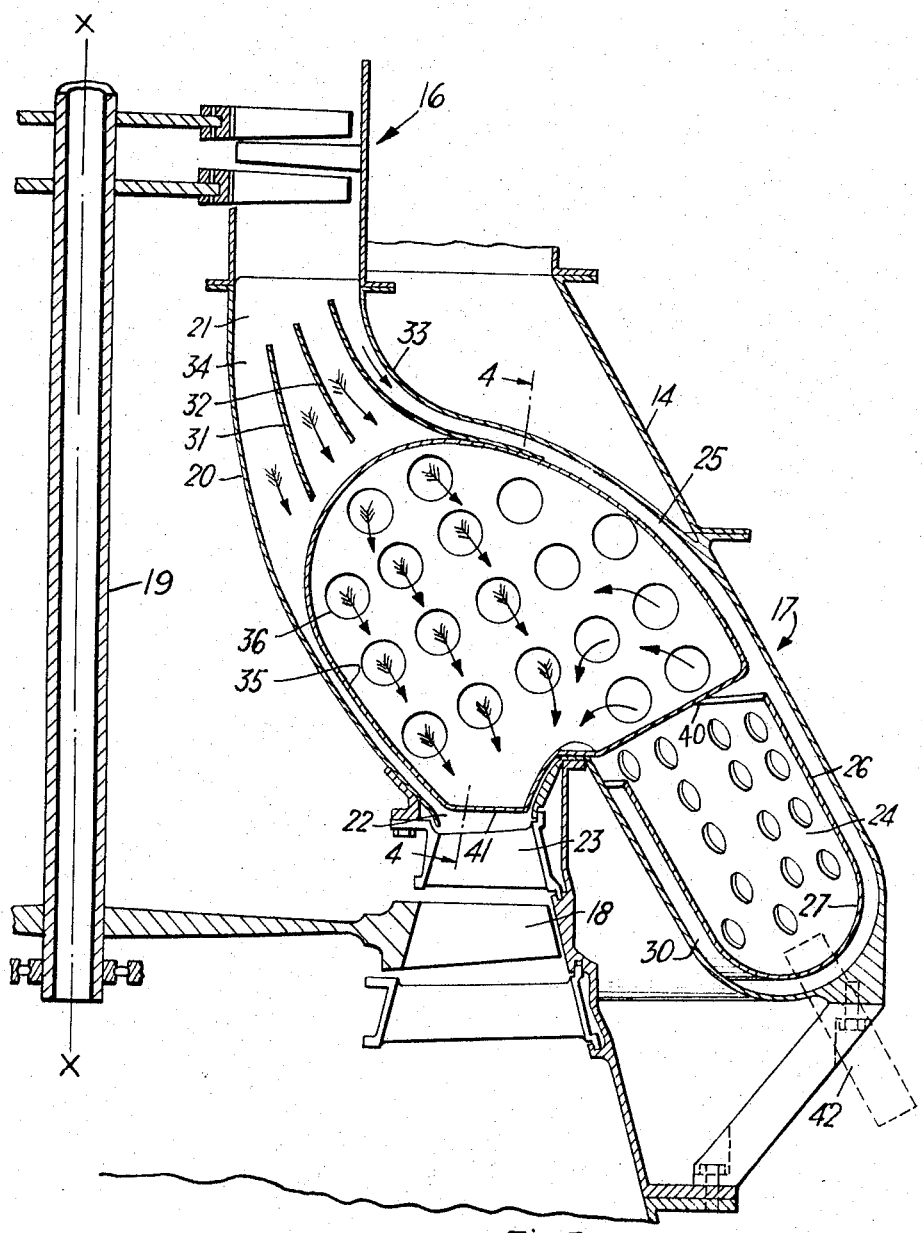

The invention is illustrated, merely by way of example, in the accompanying drawings, in which:

FIGURE 1 is an underside plan view of an aircraft provided with vertical lift engines each of which has a combustion chamber according to the present invention, FIGURE 2 is a diagrammatic elevation of one of the said vertical lift engines, FIGURE 3 is a broken away sectional view showing the combustion chamber of one of the said vertical lift engines, and FIGURE 4 is a broken away sectional view taken on the line 4—4 of FIGURE 3.

In FIGURE 1 there is shown an aircraft 10 having wings 11 in each of which there are mounted a plurality of vertical lift gas turbine jet propulsion engines 12. Each of the engines 12 is mounted vertically with respect to the normal horizontal flight attitude of the aircraft 10 and has a thrust to weight ratio of at least 16:1.

Each of the engines 12 has an engine casing 14 and mounted in flow series within the engine casing 14 is an axial flow compressor 16, an annular combustion chamber 17, and an axial flow turbine 18. The compressor 16 and turbine 18 are mounted on a common shaft 19 (part of which is shown in FIGURE 2) for rotation about an axis X—X.

The combustion chamber 17 of each engine 12 has an inner casing 20 and an intermediate portion positioned between axially spaced annular inlet and outlet portions 21, 22 which are situated at the inner portion of the combustion chamber 17. The annular inlet portion 21 communicates substantially directly with and receives air from the compressor 16, while the annular outlet portion 22 communicates substantially directly with and supplies combustion gases to the turbine 18, via nozzle guide vanes 23.

The combustion chamber 17 has a single annular flame tube 24 which is mounted within and spaced from the engine casing 14 the upstream end of the inlet portion 21 being disposed forwardly of any portion of the flame tube 24 and a substantial part of the flame tube 24 being disposed rearwardly of the downstream end of the outlet portion 22. The whole of the flame tube 24, as will be seen from FIGURE 3, is disposed radially outwardly of the outlet portion 22, the flame tube 24 being radially aligned with the axial flow turbine 18, and being offset obliquely with respect to the longitudinal axis of the engine 12. An open end of the annular flame tube communicates with the intermediate portion of the combustion chamber.

The combustion chamber 17 is provided with an annular combustion air duct 25 which is adapted to supply the annular flame tube 24 with combustion air which has passed through the inlet portion 21. The annular combustion air duct 25 extends along the radially outer side of the annular flame tube 24, the flame tube 24 having a wall 26 provided with inlet apertures 27 through which the combustion air from the combustion air duct 25 may enter the flame tube 24. The combustion air duct 25 communicates with a cooling air duct 30 which extends along the radially inner side of the annular flame tube 24, the cooling air duct 30 thus receiving air from the combustion air duct 25.

If desired, the combustion air duct 25 may also extend for a short distance along the radially inner side of the annular flame tube 24.

Mounted within the inlet portion 21 are guide vanes 31, 32, 33 of which the latter directs part of the inlet air into the combustion air duct 25 and part of the inlet air into an annular dilution air duct 34 for the flow therethrough of air which is used to dilute the products of combustion.

A plurality of angularly spaced apart hollow members 35 are mounted in the combustion chamber 17, each hollow member 35 having apertures 36 in its wall through which dilution air from the dilution air duct 34 may pass into the interior of the hollow member 35. Each hollow member 35 has an inlet portion 40, which communicates with the outlet of the flame tube 24 so as to receive the products of combustion therefrom, and an outlet portion 41 which communicates with the outlet portion 22 of the combustion chamber 17.

Thus, the dilution air passes substantially axially through the combustion chamber 17 without its direction of flow being reversed.

Fuel is injected into the flame tube 24 through a plurality of angularly spaced apart injectors 42 which are supplied with fuel from an annular manifold 43.

If desired, the cooling air duct 30, instead of receiving its air from the combustion air duct 25, could be arranged (by means of suitably shaped chutes or by means of ducting, not shown) to receive cooling air directly from the inlet portion 21.

In FIGURE 2 the flow of air through the combustion air duct 25 and cooling air duct 30 and the subsequent reversal of direction of the exhaust gas flow, is illustrated by plain arrows, while the flow of dilution air is illustrated by feathered arrows.

It is thus only the combustion and cooling air which is reversed in direction in the combustion chamber shown in the drawings, the dilution air (which constitutes the greater part of the total air employed) suffering no such reversal of direction. Accordingly pressure losses resulting from such reversals of direction are minimised. The design of the combustion chamber 17 shown in the drawings permits the axial length of the combustion chamber 17 to be reduced, at the expense, of course, of increased engine diameter in the region of the combustion chamber 17. This reduction in axial length permits the engines 12 to be mounted vertically within the wings 11.

The invention is also applicable to by-pass engines 12 (which need not necessarily be vertical lift engines) and these by-pass engines may have a high by-pass ratio, e.g., of at least 1.5:1. Such engines may have a by-pass duct 44 of which the casing 14 forms the inner wall.

As will be seen, notwithstanding the fact that the flame tube 24 is offset obliquely with respect to the longitudinal axis of its engine 12, its presence does not substantially impede the flow of by-pass air through the by-pass duct 44.

I claim:

1. A gas turbine engine having an axial flow compressor, a combustion chamber which receives air compressed by the compressor, and a turbine driven by exhaust gases from the combustion chamber, said combustion chamber comprising a casing structure having an annular inlet portion which communicates with and receives air from the compressor an annular intermediate portion and an annular outlet portion which communicates with and supplies combustion gases to the turbine, both the said annular inlet and outlet portions being disposed at an inner portion only of the engine, an annular flame tube having radially outer and inner parts and mounted within the casing structure and spaced therefrom, substantially all of the flame tube being disposed radially outwardly of the said turbine and having its upstream end in open communication with said intermediate portion, and the upstream end of the annular inlet portion being disposed forwardly of any portion of the flame tube, combustion means in the radially outer part of the flame tube, means for supplying fuel to said combustion means, first air directing means for directing a portion only of the air passing through the annular inlet portion to combustion means and second air directing means for passing substantially all the remaining portion of said air through the intermediate portion at the radially inner part of the combustion chamber to said annular outlet portion without substantially changing the direction of flow of said remaining portion.

2. A gas turbine engine as claimed in claim 1 in which at least a substantial part of the flame tube is disposed rearwardly of the downstream end of the outlet portion.

3. A gas turbine engine as claimed in claim 1 in which said first air directing means is an annular air duct extending along at least one side of the said annular flame tube.

4. A gas turbine engine as claimed in claim 3 in which the said one side is the radially outer side of the annular flame tube.

5. A gas turbine engine as claimed in claim 4 including an annular cooling air duct which extends along the radially inner side of the annular flame tube.

6. A gas turbine engine as claimed in claim 1 in which said second air directing means includes an annular dilution air duct for the flow therethrough of air for diluting exhaust gases from the combustion chamber.

7. A gas turbine engine as claimed in claim 6 in which said inlet portion includes guide means for directing part of the inlet air into the intermediate portion and part of the inlet air into the dilution air duct.

8. A gas turbine engine as claimed in claim 6 in which a plurality of angularly spaced apart hollow members are mounted in the casing structure, each hollow member having an apertured wall through which dilution air from the dilution air duct passes into the interior of the hollow member, and each hollow member having an inlet portion which is arranged to receive the said products of combustion from said flame tube and an outlet portion which communicates with the outlet portion of the casing structure.

9. A gas turbine engine as claimed in claim 1 in which the engine is a by-pass engine, the said casing structure forming a wall of the by-pass duct of the engine.

10. A gas turbine engine as claimed in claim 9 which the engine has a by-pass ratio of at least 1.5:1.

11. A gas turbine engine as claimed in claim 1 in which the flame tube of the said combustion chamber is offset obliquely with respect to the longitudinal axis of the engine.

12. A gas turbine engine as claimed in claim 1 in which the engine is a vertical lift engine having a thrust to weight ratio of at least 8:1.

References Cited

UNITED STATES PATENTS

| 2,595,999 | 5/1952 | Way et al. | 60—39.65 |
| 2,616,258 | 11/1952 | Mock | 60—39.65 |
| 2,630,679 | 3/1953 | Sedille | 60—39.65 |
| 2,664,702 | 1/1954 | Lloyd et al. | 60—39.65 |
| 3,122,886 | 3/1964 | Davidovic | 60—39.74 X |

JULIUS E. WEST, *Primary Examiner.*